Figure 1:
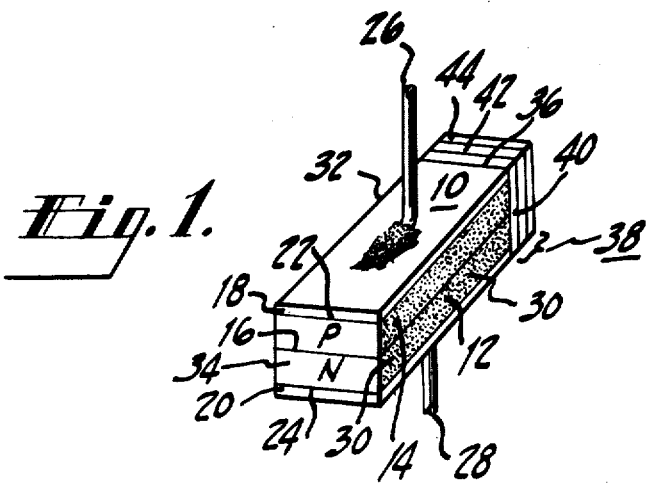

United States Patent

Caplan et al.

[15] 3,701,047
[45] Oct. 24, 1972

[54] SEMICONDUCTOR LASER DEVICES UTILIZING LIGHT REFLECTIVE METALLIC LAYERS

[72] Inventors: Sandor Caplan, Trenton; Michael F. Lamorte, Princeton, both of N.J.

[73] Assignee: RCA Corporation

[22] Filed: Aug. 16, 1966

[21] Appl. No.: 572,845

[52] U.S. Cl. .................331/94.5, 332/7.51, 313/108
[51] Int. Cl. ....................................H01s 3/18
[58] Field of Search ..313/108 D; 331/94.5; 307/88.5

[56] References Cited

UNITED STATES PATENTS 3,248,670   4/1966   Dill et al. ...................331/94.5

Primary Examiner—Carl D. Quarforth
Assistant Examiner—J. M. Potenza
Attorney—Glenn H. Bruestle

[57] ABSTRACT

A P-N junction semiconductor laser diode in which light reflective metallic layers are provided on the optically flat opposed surfaces of the diode. A transparent insulating coating having a particular thickness covers each of the semiconductor end surfaces. A thin metallic layer is disposed on each of the insulating layers. One of the metallic layers is sufficiently thick to totally reflect light emitted from the P-N junction, whereas the other metallic layer is such as to reflect approximately 99 percent of the radiated light. A transparent insulating material protects the exposed surfaces of each of the metallic layers.

3 Claims, 3 Drawing Figures

PATENTED OCT 24 1972 3,701,047

INVENTORS
SANDOR CAPLAN &
MICHAEL F. LAMORTE
BY Arthur J. Spechler
Attorney

SEMICONDUCTOR LASER DEVICES UTILIZING LIGHT REFLECTIVE METALLIC LAYERS

The invention herein described was made in the course of or under a contract or subcontract thereof with the Department of the Army.

This invention relates generally to semiconductor devices, and more particularly to light-emitting diodes with novel light-reflective means. The novel light-reflective means are particularly useful for providing improved laser diodes of the GaAs (gallium arsenide) type.

A light-emitting diode, such as a GaAs laser diode, has a pair of opposed, polished, parallel, planar ends. When the diode is forward biased, minority carriers are injected into its space-charge region. The recombination of the minority carriers at low current densities causes the diode to emit incoherent (spontaneous) light. If the current density is increased to a threshold value (i.e., about 1,000 amperes per square centimeter at 77° K), it produces a population inversion, a condition in which the normal energy-level distribution of electrons in the space-charge region is reversed, that is, more electrons are in the high-energy levels than in the low-energy levels. Coherent stimulated radiation occurs at the threshold current density. Both incoherent and coherent emissions occur in the space-charge region surrounding the PN junction of the diode.

In order for a laser diode to lase, the radiant energy, that is, the stimulated emission occurring in the space-charge region, is reflected (oscillated) back and forth between the opposed, polished, parallel, planar ends of the diode. The highly polished, planar ends of a gallium arsenide laser diode, however, are only about 30 percent reflective, and the laser radiation oscillation is limited thereby. For greater lasing efficiency, it has been found desirable to have one planar end of the diode totally light-reflective and the other end partially light-reflective. Under these conditions, the stimulated emission within the diode is increased, and that portion of the increased radiant energy which is transmitted through the partially light-reflective planar end is, consequently, also increased.

While metal layers make the best light-reflective means, their use has been practically precluded heretofore in certain semiconductor laser diodes because it has not been possible to solder leads or metal mounting means to the P and N regions of the diode without causing some damage to the light-reflective metal layer and/or the diode. The heat required for the soldering operation would either melt or vaporize the reflective metal layer so that the diode would be shorted and/or the reflective layer destroyed. It has been proposed to use pressure contacts instead of soldered contacts for applying current to light-emitting diodes, but pressure contacts are not as desirable as the soldered contacts from both reliability and performance standpoints.

It is an object of the present invention to provide improved light-emitting diodes whose current is applied through soldered metal coatings and whose total light emission is from a single planar end.

Another object of the present invention is to provide an improved laser diode whose threshold current is relatively lower than prior-art laser diodes not employing the novel light-reflective means.

Still another object of the present invention is to provide improved laser diodes whose total output radiation for a given current level is relatively higher than prior-art diodes not employing the novel light-reflective means.

Briefly stated, each of the improved light-emitting diodes comprises a body of semiconductive material having a PN junction and a pair of opposed, parallel, planar ends transverse to, and including, the PN junction. In one embodiment of the improved, light-emitting diodes, novel, totally light-reflective means are disposed on one of the planar ends of the diodes. The light-reflective means comprise a first layer of electrically insulating material on the planar end, a second layer of a totally light-reflective material on the first layer, and a protective third layer of an electrically insulating material on the second layer. In another embodiment, the improved light-emitting diode comprises, in addition to the above, novel, partially light-reflective means on the other planar end of the diode. The novel, partially light-reflective means are somewhat similar to the novel, totally light-reflective means except that the light-reflective layer in the former is thinner and partially transparent to light. In still another embodiment of the improved light-emitting diode, novel, light-reflective means, on at least one of the planar ends, comprise first and third layers of insulating material which completely surround a second light-reflective layer.

By the term "light", as used herein, is meant electromagnetic radiation in the invisible regions as well as in the visible region.

Figure 2:
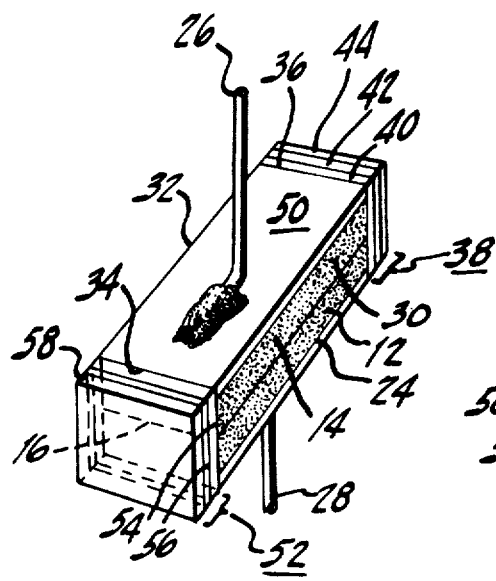
Figure 3:
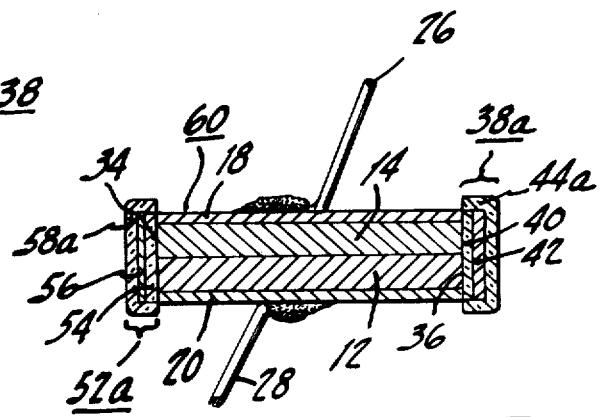

The improved semiconductor devices employing the novel light-reflective means will be described in detail with reference to the accompanying drawing, in which similar components of various embodiments of the invention have similar reference characters, and in which:

FIG. 1 is a perspective view of one embodiment of an improved, light-emitting diode employing novel, totally light-reflective means on one of its planar ends;

FIG. 2 is a perspective view of another embodiment of an improved, light-emitting diode employing both novel totally light-reflective and partially light-reflective means on the opposed, parallel, planar ends, respectively, of the diode; and FIG. 3 is a longitudinal cross-section of still another embodiment of an improved light-emitting diode employing another embodiment of novel, totally light-reflective and partially light-reflective means on the opposed, parallel, planar ends, respectively, of the diode.

Referring now to FIG. 1 of the drawing, there is shown an improved light-emitting diode 10 of semiconductor material, such as a gallium arsenide laser diode, in the form of a right parallelepiped. The diode 10 comprises an N type region 12 and a P type region 14 of semiconductor material, forming a planar PN junction 16 therebetween. Metal coatings 18 and 20 of tin, nickel, and/or lead, for example, are formed on the opposed, parallel surfaces 22 and 24 of the regions 14 and 12, respectively, to provide means for soldering electrical connectors 26 and 28 thereto.

When current of sufficient amplitude, that is, at least equal to or greater than a threshold value, is caused to flow through the diode 10, coherent light is emitted from the diode 10 in the plane of the PN junction 16. If the current is below the threshold value, incoherent light is emitted from the PN junction 16.

A first pair of opposed, parallel surfaces 30 and 32 of the diode 10 are roughened, as by sawing, to prevent light from being specularly reflected into the PN junction 16 at these surfaces. The opposed, parallel, planar ends 34 and 36 of the diode 10 are polished to provide light-reflective surfaces from which light generated within diode 10 can be reflected. However, even though highly polished, the planar ends 34 and 36 are only about 30 percent reflective.

To provide more efficient lasing than is possible with only the polished ends 34 and 36 of the diode 10, novel, totally light-reflective means 38 are fixed to the planar end 36. Thus, a first layer 40 of a light-transparent, electrically insulating material, such as silicon monoxide (SiO), silicon dioxide ($SiO_2$), or silicon nitride ($Si_3N_4$), for example, is deposited on the planar end 36 by any suitable means known in the art. The layer 40 is about 2500 A in thickness and serves to protect the PN junction 16 from being shorted by a subsequent layer of totally light-reflective means. A desired thickness for the layer 40 can be determined from the formula $$T = \lambda/2n$$

where
T = the thickness of the insulating material in A,
λ = the lasing wavelength in A, and
n = the index of refraction of the insulating material.
For a GaAs laser diode emitting coherent emission with a wavelength of about 9000 A, the value for I is about 2500 A when silicon dioxide (index of refraction equals 1.8) is used for the layer 40.

A second layer 42 of a light-reflective material, for example, a metal such as gold, silver, aluminum, chromium, or alloys thereof, is deposited on the insulating layer 40 by any suitable means known in the art. The thickness of the metal layer 42 is such as to function as a totally light-reflective material. When the second layer 42 is of gold, a preferred metal for use with GaAs lasers, the thickness of the layer 42 is at least greater than 1000 A.

It has been found that unless the second light-reflective layer 42 is protected, it tends to melt and/or evaporate during the soldering operation when the connectors 26 and 28 are soldered to the metal coatings 18 and 20, respectively. Damage to the light-reflective layer 42 is prevented by applying a third layer 44 of an electrically insulating material, such as $SiO_2$, for example, on the layer 42 to protect the latter. The thickness of the protective layer 44 is not critical, but it is preferably the same as the insulating layer 40.

In operation, light is emitted only from the region of the PN junction 16 in the planar end 34 when the diode 10 is forward biased and a predetermined amount of current flows through the PN junction 16. The radiant energy within the diode 10 is reflected back and forth between the polished planar end 34 and the totally light-reflective layer 42 so that the only light emerging from the diode 10 is through the planar end 34.

Referring now particularly to FIG. 2 of the drawing, there is shown an improved laser diode 50, another embodiment of the invention, somewhat similar to the improved laser diode 10 except that the diode 50 has, in addition, novel, partially light-reflective means 52 on the planar end 34. Thus, a layer 54 of an electrically insulating material, such as $SiO_2$, for example, is deposited on the planar end 34. The insulating layer 54, like the insulating layer 40, also has a thickness of about 2500 A. A partially light-reflective layer 56 is deposited on the insulating layer 54 by any suitable means. The partially light-reflective layer 56 may be of a metal, similar to that of the totally light-reflective layer 42, but the thickness of the partially light-reflective layer 56 is less, being less than 1000 A in thickness, so that some of the radiant energy generated within the diode 50 can be transmitted through it. The partially light-reflective layer 56 is protected by a protective layer 58 of electrically insulating material, such as silicon dioxide, for example, deposited on the layer 56 by any suitable means known in the art. The thickness of the protective layer 58 is not critical and may be in the order of about 2500 A.

The partially light-reflective means 52 may reflect as much as 99 percent of the radiant energy generated within the diode 50 and transmit only about 1 percent of the radiant energy. When the laser diode 50 is forward biased with current of a threshold value, the light energy generated within the diode 50 is reflected back and forth between the light-reflective layers 42 and 56 of the light-reflective means 38 and 52, respectively. This oscillation produces light which, in turn, stimulates the recombination of additional minority carriers within the space region of the diode 50 to produce additional radiant energy. A portion of this increased radiant energy is transmitted through the partially light-reflective means 52. Even though only a small portion of the increased radiant energy is transmitted through the partially light-reflective means 52, this transmitted amount may be greater than that emitted from the polished planar end 34 of a laser diode employing no additional light-reflective means or only one light-reflective means. This increased transmission of radiant energy is due to the increased stimulation of energy within the diode 50.

Referring now to FIG. 3 of the drawing, there is shown another embodiment 60 of the improved light emitting diode, employing novel, totally light-reflective means 38a and novel, partially light-reflective means 52a. The reference characters for the embodiment of the improved light emitting diode 60 are the same as those for the diodes 10 and 50 where the components are similar, and have an additional letter character on those parts which have been modified. The totally light-reflective means 38a of the diode 60 comprise the electrically insulating layer 40, the totally light-reflective layer 42, and a protective layer 44a of electrically insulating material which has peripheral portions that touch the peripheral portions of the insulating layer 40 to completely surround, that is, to encapsulate the metallic layer 42. Thus encapsulated, the totally light-reflective layer 42 will not melt or vaporize when the connectors 26 and 28 are soldered to the metal coatings 18 and 20 on the N and P regions 14 and 12, respectively, of the diode 60.

The partially light-reflective means 52a of the diode 60 is similar to the partially light-reflective means 52 of the diode 50 except that a protective layer 58a has peripheral portions which contact the electrically insulating layer 54, thereby surrounding the partially light-reflective layer 56 and protecting it from damage by the heat produced in the aforementioned soldering operation.

From the foregoing description, it will be apparent that there have been provided improved light-emitting diodes, employing novel, protected, light-reflective means that will withstand the heat produced by soldering leads to the diodes. The improved diodes therefore provide improved circuit reliability and performance. Also, since the novel, light-reflective means cause increased stimulation of radiant energy within the diodes for a given current value, the radiant energy emitted from one end of each of the diodes is also increased, thereby providing improved light-producing efficiency. While the improved light-emitting diodes and their novel light-reflective means have been described and illustrated by only a few embodiments, variations in the structures, all coming within the spirit of the invention, will, no doubt suggest themselves to one skilled in the art. Hence, it is desired that the foregoing description shall be considered merely as illustrative and not in a limiting sense.

What is claimed is:

1. In a semiconductor diode of the type wherein a pair of electrical connections are soldered to metal coatings on a pair of opposed surfaces of P and N regions, respectively, of said diode to provide means to bias said diode in the forward direction, whereby to cause said diode to emit radiant energy along a P-N junction plane, said diode having two opposed planar ends transverse to, and including, said P-N junction plane, the improvement comprising a first layer of radiant-energy transmitting, electrically insulating material on one of said ends, said first layer having a thickness on the order of $\lambda/2n$, where $\lambda$ is the wavelength of said radiant energy and n is the index of refraction of said insulating material, a second layer of a light-reflective metal on said first layer, said second layer having a thickness to substantially reflect said radiant energy, and a third protective layer of electrically insulating material comprising silicon monoxide, silicon dioxide or silicon nitride on said second layer.

2. The improvement according to claim 1, wherein portions of said first and third layers are contiguous and surround said second layer.

3. The improvement according to claim 1, wherein the thickness of said second layer is sufficient to totally reflect said radiant energy.

* * * * *